United States Patent [19]
Robinson et al.

[11] Patent Number: 5,484,337
[45] Date of Patent: Jan. 16, 1996

[54] CONTROL SYSTEM FOR A COTTON HARVESTER

[75] Inventors: James W. Robinson, Orion; Alan H. Ludwig, Hinsdale; Lindy M. Tribbett, Woodridge, all of Ill.

[73] Assignee: Case Corporation, Racine, Wis.

[21] Appl. No.: 252,578

[22] Filed: Jun. 1, 1994

[51] Int. Cl.⁶ ................................................ A01F 12/60
[52] U.S. Cl. ................... 460/119; 56/10.2 R; 56/28
[58] Field of Search .............. 460/119, 1; 56/10.2 R, 56/28, 10.2G

[56] References Cited

U.S. PATENT DOCUMENTS

| | | | |
|---|---|---|---|
| 2,862,342 | 12/1958 | Fergason | 56/12 |
| 3,744,228 | 7/1973 | Lundahl | 56/344 |
| 3,813,861 | 6/1974 | Wood | 56/344 |
| 3,880,468 | 4/1975 | Steingas et al. | 298/11 |
| 3,886,719 | 6/1975 | Garrison | 56/344 |
| 3,901,142 | 8/1975 | Wood | 100/255 |
| 3,965,660 | 6/1976 | Kanengieter et al. | 56/344 |
| 3,968,634 | 7/1976 | Anderson et al. | 56/344 |
| 4,005,565 | 2/1977 | Lowe et al. | 56/344 |
| 4,059,942 | 11/1977 | Trimble et al. | 56/30 |
| 4,341,423 | 7/1982 | Fachini et al. | 298/18 |
| 4,519,189 | 5/1985 | Fachini et al. | 56/16.6 |
| 4,662,160 | 5/1987 | Hubbard et al. | 56/16.6 |
| 4,706,710 | 11/1987 | Meyer et al. | 137/625.47 |
| 4,793,126 | 12/1988 | Wood et al. | 56/16.6 |
| 4,907,402 | 3/1990 | Pakosh | 460/119 X |
| 4,930,297 | 6/1990 | Schlueter et al. | 56/16.6 |

Primary Examiner—Terry Lee Melius
Attorney, Agent, or Firm—Rudnick & Wolfe

[57] ABSTRACT

A control system for effecting removal of cotton from an elevationally movable basket of a cotton harvester. The control system includes operational circuitry for allowing removal of stored cotton from the basket after the basket is elevated to a discharge position relative to a frame of the harvester. The control system further includes by-pass circuitry for effecting expeditious removal of stored cotton from the basket of the cotton harvester while the basket remains in a lower cotton receiving position relative to the harvester. A control switch is provided to allow the operator to select which circuitry is enabled to effect the discharge of cotton to allow the cotton harvester.

27 Claims, 4 Drawing Sheets

CONTROL SYSTEM FOR A COTTON HARVESTER

The present invention generally relates to cotton harvesters and, more particularly to a control system for controlling the discharge of harvested cotton from a basket of a cotton harvester.

BACKGROUND OF THE INVENTION

A conventional cotton harvester includes an assembly of row units mounted across a front end of and movable with the harvester. As the harvester is driven across the field, the row units pick or strip cotton from the plant rows in the field. The cotton harvested by the row units is drawn into duct structure leading from the row units by a fan assembly. After the cotton is drawn into the duct structure, the fan assembly effectively forces harvested cotton upwardly and into a basket or bin.

In more modern cotton harvesters, the cotton basket or bin is mounted on a frame of the harvester for elevational movement between a lower cotton receiving or harvesting position and an upper cotton discharge position. When cotton is to be discharged from the basket, a truck or wagon is pulled adjacent to the basket on the harvester and the basket is raised or elevated to the discharging position to allow cotton to be effectively removed or dumped from the basket into the track or wagon.

A basket on a cotton harvester typically includes a walled structure having a hinged door on one side thereof through which the cotton is discharged from the basket. A conveyor assembly extends across a floor or bottom of the basket and preferably extends across at least a portion of the door. After the door of the basket is opened, operation of the conveyor assembly effectively conveys cotton frown the basket across the door from where the cotton is dumped into the truck or wagon.

A plurality of manually actuated switches are located in a cab region of the harvester for effecting the unloading of the cotton from the basket. The manually operated switches are normally operated in sequential order by the operator and include a basket lift switch, a door open switch, and a conveyor switch. To normally unload the cotton into the truck, the operator must initially move the basket from its harvesting position into an elevated position by actuating the basket lift switch that activates a lift motor assembly causing the basket to move elevationally from a lowered or harvesting position to a raised position.

After the basket is in its elevated position, the door of the basket must be swung open so that the cotton can be unloaded from the basket and into the truck. To effect such ends, the door open switch is manually actuated by the operator. As will be appreciated, the door open switch activates a door motor assembly that causes the door to move between its open and closed position.

Once the door is open, the conveyor assembly is operated to remove cotton from the basket and into the truck. Operation of the conveyer assembly is controlled by the manually actuated conveyor switch. The conveyor switch enables a conveyor motor assembly to operate the conveyor assembly thereby unloading the cotton from the harvester. Once the cotton is unloaded into from the basket and moved the truck the conveyor assembly is stopped, the door is closed, and the basket is returned to its harvesting position.

There are abnormal conditions which are occasionally encountered during the harvesting process when the harvested cotton needs to be expediently unloaded from the harvester. In such circumstances, the operator wants to quickly discharge the cotton stored in the basket of the harvester and shut off the fan assembly without having to sequentially engage a series of switches. In such circumstances, the operator also wants to expeditiously discharge the cotton stored in the basket as through operation of a single switch which would then allow the operator to vacate the cab station of the harvester. The cotton harvester control systems currently available, however, are not equipped to expeditiously discharge cotton from a basket of the cotton harvester.

Thus, there is a need and a desire for a cotton harvester control system that will allow cotton stored within the basket to be automatically and expeditiously unloaded therefrom with minimal operator participation being required to effect the expeditious discharge of stored cotton from the harvester.

SUMMARY OF THE INVENTION

In view of the foregoing, and in accordance with the present invention, there is provided a control system for effecting removal of cotton frown an elevationally movable basket or bin of a cotton harvester. The control system of the present invention includes operational circuitry for allowing normal removal of stored cotton from the basket alter the basket is elevated to a discharge position relative to a frame of the harvester. The control system of the present invention further includes by-pass circuitry for effecting expeditious removal of stored cotton from the basket of the cotton harvester while the basket remains in a lower cotton receiving position relative to the frame of the harvester.

The cotton harvester to which the present invention applies has a mobile frame with a plurality of row units mounted across a forward end of the frame for harvesting cotton from plant rows as the harvester is driven across a field. The basket is mounted on the frame for receiving and holding cotton harvested by the row units. Duct structure having a conventional fan assembly arranged in combination therewith directs the harvested cotton from the row units to the basket.

In the illustrated form of the invention, the basket is elevationally movable relative to the frame mid includes a floor with spaced upright walls extending therefrom. In a preferred form of the invention, a hinged door, movable between an open and closed positions, forms at least a portion of one of the upright walls. The basket floor includes a conveyor assembly that facilitates discharging cotton from the basket. The conveyor assembly elevationally moves with the basket and further defines at least a portion of the door. After the door is opened, and when engaged by the operator, the conveyor assembly serves to forcibly remove stored cotton from the basket and across the door. In the illustrated form of the invention, the conveyor assembly includes a chain and slat conveyor.

A lift motor assembly is connected between the basket and the frame of the harvester for elevationally positioning the basket between a harvesting or cotton receiving position and a cotton discharging position. The lift motor assembly preferably includes two hydraulic cylinders mounted toward opposite ends of the basket. Movements of the door are effected through a door motor assembly. In a preferred form of the invention, the door motor assembly includes one or more hydraulic cylinders connected between the basket and the door. A conveyor motor assembly controls movement of the conveyor assembly.

The operational circuitry of the present invention is connected to a suitable power source and serves to normally and effectively discharge stored cotton from the basket of the harvester following elevational movement of the basket to a raised discharge position. In the illustrated form of the invention, a series of switches associated with the operational circuitry are required to be manually actuated in a predetermined sequence to effect the discharge of cotton from the basket. The operational circuitry includes a manually actuated door switch for opening the door of the basket only after the basket is elevated into a predetermined position. Following opening the door, a manually actuated conveyor switch of the operational circuitry is operated to operate the conveyor assembly thus discharging cotton from the basket.

The by-pass circuitry of the control system is also connected to the power source on the harvester for effecting expedient discharge of stored cotton from the basket. The by-pass circuitry allows for the door of the basket to be swung open notwithstanding the elevational position of the basket relative to the frame followed by automatic engagement of the conveyor motor resulting in movement of the conveyor assembly to forcibly remove stored cotton from the basket.

In the illustrated embodiment, the operational circuitry and by-pass circuitry are each connected to the power source through a selectively operable control switch. During normal operation of the harvester, the control switch is positioned to enable the operational circuitry. Accordingly, the discharge of cotton from the basket is dependent upon the elevational positioning of the basket relative to the frame of the harvester and the operator is required to follow a sequential order of switch manipulation to effect the discharge of cotton from the basket. When an abnormal condition arises, however, the control switch can be moved or switched to a second position to enable the by-pass circuitry. As will be appreciated, enabling the by-pass circuitry allows for the automatic and expeditious removal of stored cotton from the basket notwithstanding the elevational position of the basket and requiring the operator to only move the control switch to the second position. After the control switch is set to the second position to enable the by-pass circuitry, the operator is permitted to leave the cab region since the discharge of cotton is thereafter effected automatically.

In a most preferred from of the invention, the control system further includes fan circuitry for controlling operation of the fan assembly arranged in combination with the duct structure. As long as the control switch is set to enable the operational circuitry of the control system, the fan circuitry allows the fan assembly to operate in its normal mode of operation in combination with the duct structure. When the operator changes the control switch to enable the by-pass circuitry, however, the fan circuitry disables the fan assembly thus withdrawing the impetus for cotton to be drawn into the duct structure and for inhibiting harvested cotton from being propelled into the basket.

The control system of the present invention provides the operator the ability to discharge cotton frown the basket under normal conditions and in a conventional manner. Alternatively, the control system advantageously permits a more expedient and automated process of discharging cotton should abnormal conditions mandate such an alternative discharge process. Simply changing a setting on the control switch allows the operator to operate the basket in a conventional manner which relies on operator involvement in the discharge of cotton from the basket or in a more expedient and automated manner which allows the operator to vacate the cab region of the harvester once the control switch is positioned to enable the by-pass circuitry.

Numerous other features and advantages of the invention will become readily apparent from the following detailed description, the appended drawings, and the accompanied claims.

DETAILED DESCRIPTION OF A PREFERRED EMBODIMENT

Figure 1:
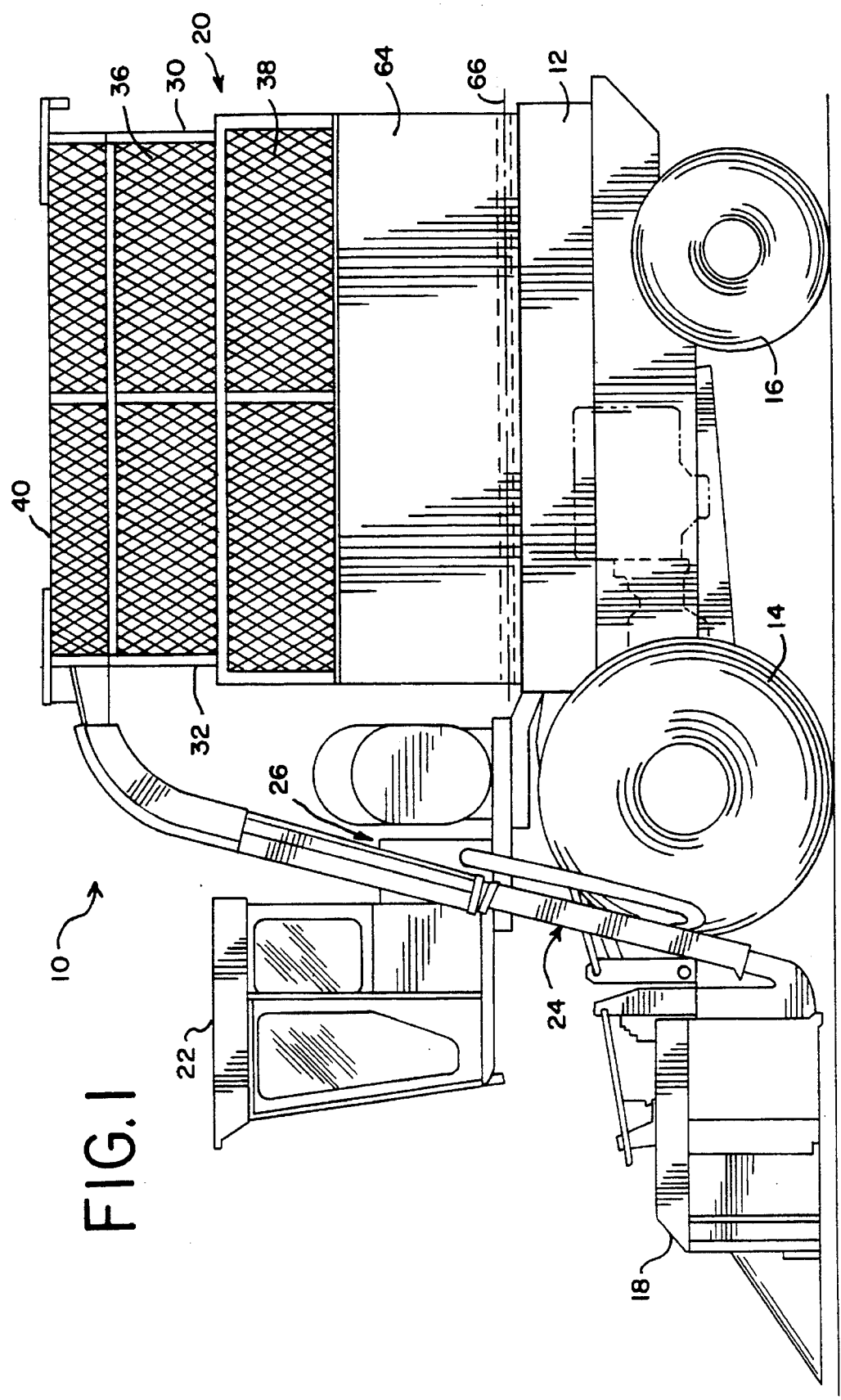
FIG. 1 is a side view of a cotton harvester that embodies the present invention.

While the present invention is susceptible of embodiment in various forms, there is shown in the drawings a presently preferred embodiment hereinafter described, with the understanding that the present disclosure is to be considered as an exemplification of the invention and is not intended to limit the invention to the specific embodiment illustrated.

Figure 2:
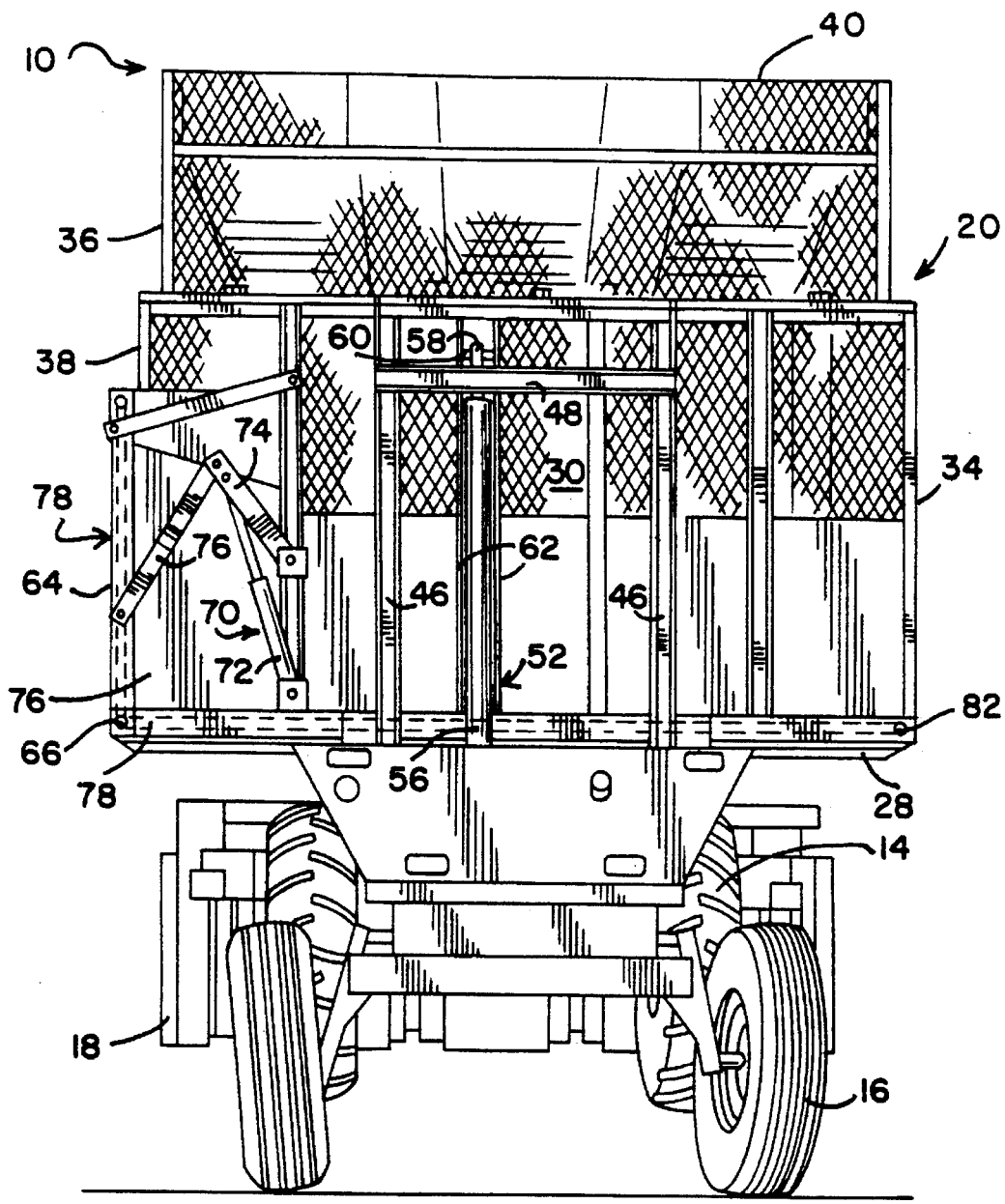
FIG. 2 is a rear perspective view of the cotton harvester shown in FIG. 1 with a cotton receiving basket being shown in a harvesting position.
Figure 3:
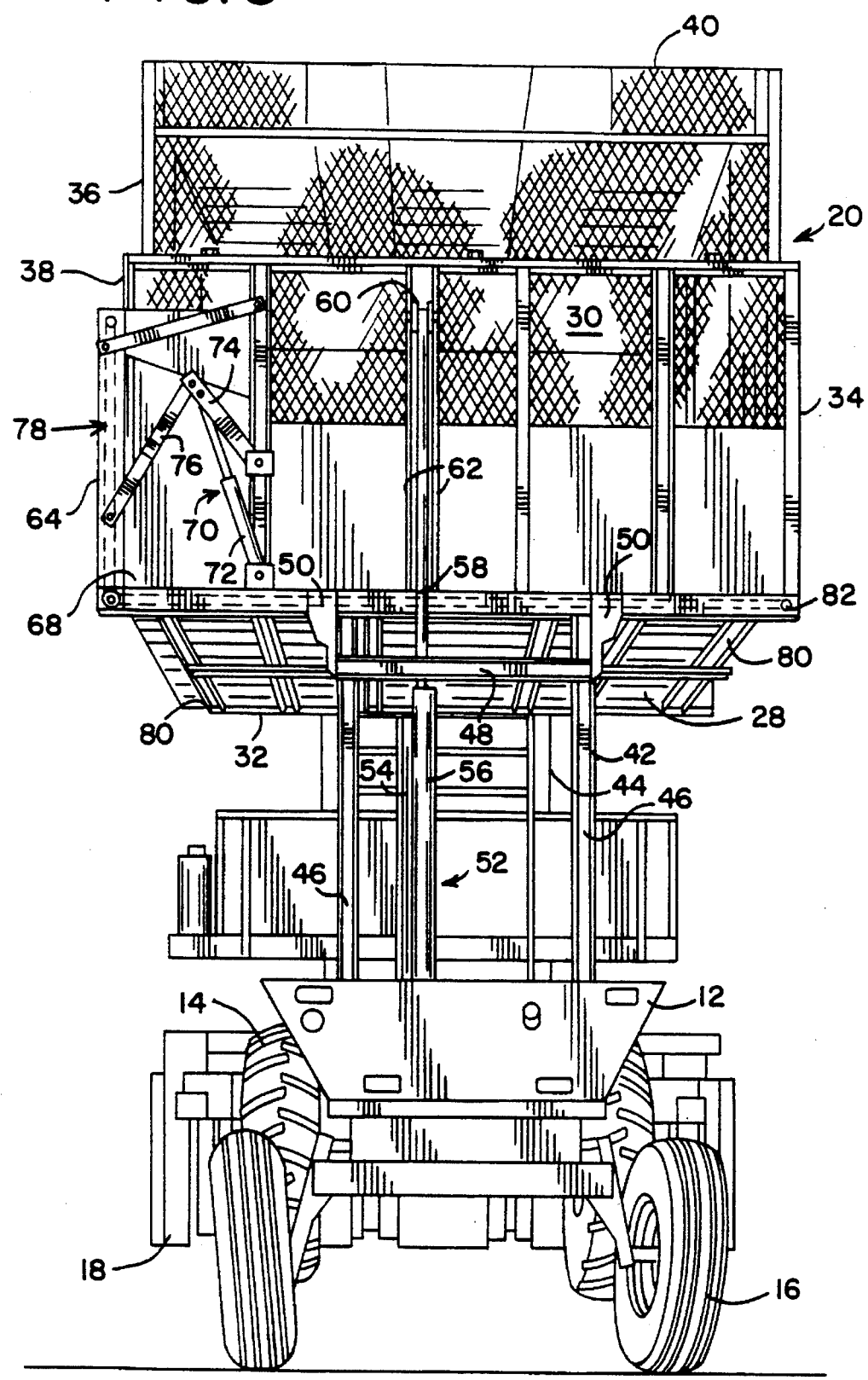
FIG. 3 is a rear perspective view of the cotton harvester similar to FIG. 2 but showing the basket in an elevated position.

Referring now to the drawings wherein like reference numerals refer to like parts throughout the several views, there is shown in FIGS. 1–3 a cotton harvester 10 having a self-propelled frame 12 supported on a pair of front drive wheels 14 and a pair of rear steerable wheels 16. The harvester includes a plurality of cotton harvesting row units 18 mounted across a front of the harvester for picking or stripping cotton from rows of cotton plants as the harvester is driven through the field. In the illustrated embodiment, a cotton receiving basket 20 is also mounted on the harvester rearwardly of a driving compartment or cab 22. The driving compartment 22 is preferably configured as an enclosure for the operator and where the controls for operating the harvester are situated.

As shown, in FIG. 1, duct structure, generally designated by reference numeral 24, is provided for directing cotton harvested by the row units 18 to the basket 20. In a conventional manner, a fan assembly 26 is arranged in combination with the duct structure 24. During operation of the harvester, the fan assembly 26 serves to draw harvested cotton into the duct structure 24 from the row units 18. The fan assembly 26 furthermore serves to forcibly propel the harvested cotton upwardly through the duct structure 24 toward the basket 20.

As shown in FIG. 3, the basket 20 incudes a floor 28, from which a rear wall 30, a front wall 32, and a side wall 34 extend upwardly. Another side wall 36 extends between the front and rear walls 30 and 32, respectively. The floor 28 and walls 30, 32, 34 and 36 combine with each other to define a cotton receiving enclosures 38. A roof structure 40 is secured toward the top of the walls 30 through 36 so as to define therewith a rigid unitary basket structure.

In the illustrated embodiment, the basket 20 is mounted on and for elevational movement relative to the frame 12 of the harvester 10 by means of forward and reward mast structures 42 and 44, respectively. Each mast structure 42, 44 includes inter-fitting frame sections secured to the frame 12 and the basket 20. The frame section secured to the frame 12 preferably includes of a pair of vertical channel members 46 interconnected by a horizontal cross brace 48. The frame section secured to the basket preferably includes of a pair of vertical members 50. The vertical members 50 have rollers (not shown) riding in the channel members 46 of the frame-mounted frame section so that the basket 20 is constrained and guided for vertical movement relative to the frame 12 of the harvester 10. As will be appreciated, other mechanisms could likewise be used for mounting the basket for elevational movement relative to the frame 12 of the harvester 10 without detracting or departing from the spirit and scope of the present invention.

As is known in the art, the basket 20 is vertically movable relative to the frame 12 between a harvesting or lowered position (shown in FIG. 2) and an elevated position (shown in FIG. 3). In the illustrated embodiment, the basket 20 moves under the influence of a lift motor assembly, generally indicated by reference numeral 52. In the preferred embodiment, lift motor assembly 52 includes a pair of vertical hydraulic cylinders 54 and 56 disposed, respectively, at the front and rear of the basket 20 adjacent to the respective mast structures 42 and 44. As shown, each hydraulic cylinder 54, 56 has a piston rod 58 releasably connected as by a pin 60 to a basket vertical flanges 62 on the basket 20. It will of course be understood that the cylinders 54 and 56 are supplied with hydraulic pressure fluid from a suitable hydraulic system in the harvester. As will be appreciated, mechanisms other than the lift motor assembly 52 described above can be provided to move the basket 20 between the harvesting position and the elevated position without departing from the spirit of the present invention.

The basket 20 further a door 64 through which cotton may be removed from the basket 20. In the illustrated embodiment, door 64 pivots about a generally horizontal axis 66 (FIG. 1) disposed such that the door 64 is substantially co-planar with the floor 28 of the basket 20 when the door swings open. Vertical side sheets 68 are secured at the opposite ends of the door 64.

The door 64 is moved between its open and closed positions by a door motor assembly, generally indicated by reference numeral 70, preferably provided at the front and rear sides of the door 64. Since both door motor assemblies 70 are identical, however, only one will be shown and described with the understanding that the other door motor assembly is substantially identical. As shown, each door motor assembly 70 includes a hydraulic cylinder 72 having one end thereof connected of the basket 20 the other end thereof operably connected to lift arms 74 and 76. One end of the lift arm 74 is pivotally mounted on a respective end wall of the basket 20 and the other lift arm 76 is pivotally connected between the free end of arm 74 and the end of the door 64. The cylinder 72 of each motor assembly is supplied with hydraulic pressure fluid from the hydraulic system of the harvester 10 and is actuated by the operator of the machine to raise and lower the door 64 as required. As will be appreciated, mechanisms other than the door motor assembly 70 described above can be provided to move the door 64 between its open and closed position without departing from the spirit of the present invention.

Figure 4:
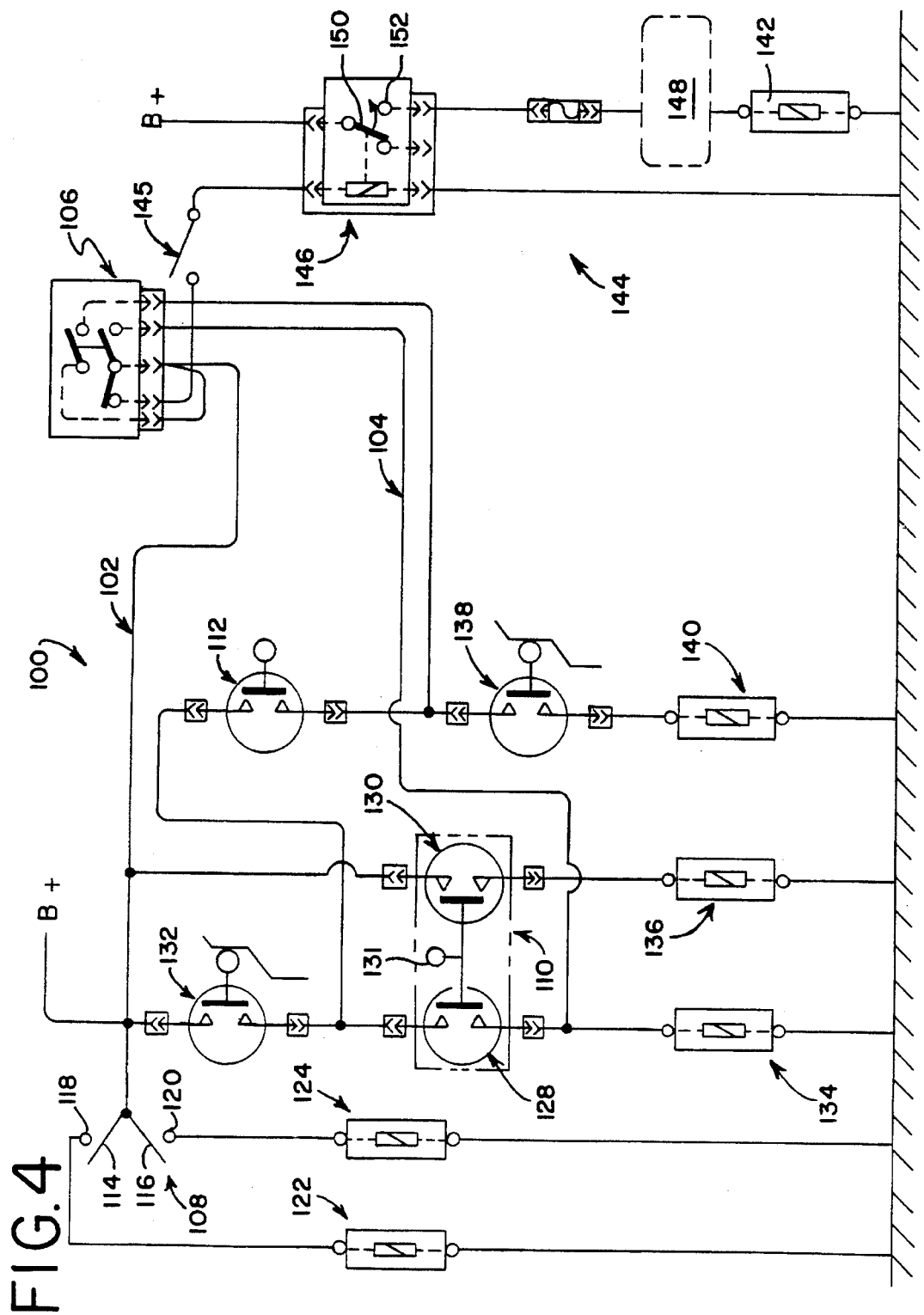
FIG. 4 is a schematic representation of a control system according to the present invention.

As shown in FIG. 3, and to promote the discharge of cotton therefrom, the basket 20 is further provided with a conveyor assembly 78. The conveyor assembly 78 preferably includes a conventional chain and slat conveyor 80. In the illustrated form of the invention, the chain and slat conveyor 80 is driven by a conventional hydraulic conveyor motor assembly 82 whose operation is controlled by a solenoid 140 (FIG. 4). In a most preferred embodiment, the conveyor assembly 78 extends across the floor 28 of the basket 20 and preferably forms at least a portion of the door 64. When the door 64 is in its open position, the door 64 and floor 28 provides a co-planar movable surface. Accordingly, cotton is removed from the basket 20 by the conveyor assembly 78 across the floor 28 and over the door 64 without a hinderance.

Within the driving compartment 22 of the cotton harvester 10, there are various control mechanisms, switches, levers and gauges that are operated and observed by an operator to effect operation of the harvester 10. With respect to the present invention, there is preferably provided within the compartment 22 multiple switches to control the unloading of the cotton from the basket 20 under a variety of situations.

A control system, schematically represented in FIG. 4 by reference numeral 100, is provided for controlling discharge of cotton from the basket 20 of the harvester 10. The control system 100 includes operational circuitry 102 and by-pass circuitry 104. Circuitries 102 and 104 are each connected to a power source B+ and are individually enabled through a manually operated control switch 106. The power source B+ may comprise the battery (not shown) on the harvester.

In the embodiment shown, the control switch 106 is a typical rocker switch having first and second positions. In its first position, the control switch 106 enables the operational circuitry 102 to allow for normal operation of the basket 20 when cotton is to be discharged therefrom. That is, when the operational circuitry 102 is enabled and the operator desires to unload the cotton from the basket 20 a series of manual switches provided in the driving compartment 22 and forming part of the operational circuitry 102 are sequentially operated. When the operational circuitry 102 is enabled, the basket 20 is elevated from the harvesting position to the elevated position where the door 64 is opened and the conveyor assembly 78 is activated to discharge cotton from the basket 20.

In the illustrated embodiment, the operational circuitry 102 includes a door switch 110, and a conveyor switch 112. Switches 110 and 112 are preferably provided in the driving compartment 22 so that the operator can manually activate them from the driving compartment in a given and predetermined sequence after the basket 20 is elevated to open the door 64, and operate the conveyor 80, respectively.

In its second position, the control switch 106 enables the by-pass circuitry 104 and disables the operational circuitry 102. Enabling the by-pass circuitry 104 allows cotton to be expeditiously removed from the basket 20 and without the basket 20 having to be moved to an elevated position relative to the frame 12 of the harvester 10. Notably, once the control switch 106 is set to enable the by-pass circuitry 104, the operator is permitted to leave the driving compartment 22, the door 64 is automatically opened, and the conveyor assembly 78 is automatically operated to discharge cotton from the basket 20.

In the illustrated embodiment, the elevational position of the basket 20 is controlled as a function of the position of a basket lift switch 108 preferably located in the driving compartment 22 of the harvester 10. Switch 108 is connected to the power source B+ and is preferably connected in parallel relation to the operational circuitry 102 of control system 100. The lift switch 108 is illustrated as a single-pole double throw switch with a neutral or off position and has movable contacts 114 and 116 which are illustrated in a neutral or open position. Switch 108 further includes a basket raise contact 118 and a basket lower contact 120. Contact 118 is connected to a solenoid 122 provided in combination with each cylinder 54, 56 (FIG. 3) of the lift motor assembly 52 for controlling the lifting movements of the basket 20 when switch 108 is manually conditioned to position contact 114 relative to contact 118. Similarly, contact 120 of switch 108 is connected to a solenoid 124 provided in combination with each cylinder 54, 56 of the motor assembly 52 for controlling the lowering of the basket 20 when switch 108 is manually conditioned to position contact 116 relative to contact 120.

In the illustrated embodiment, the door switch 110 includes a door open switch 128 and a door close switch 130 for controlling operation of the door motor assembly 70. In the illustrated embodiment, both switches 128, 130 are normally open and only one switch can be actuated or closed at any given time. Either of the switches 128, 130 are actuated or closed by manual movement of a lever 131 in either of two directions of movement. As will be appreciated, switch 110 can be otherwise configured without detracting or departing from the spirit and scope of the present invention.

As shown in FIG. 4, the door open switch 128 is connected to a sensor 132 for monitoring the elevational position of the basket 20 and to a door open solenoid 134 arranged in combination with the cylinder 72 of each door motor assembly 70 to control opening of the door 64 (FIGS. 1 through 3). The door close switch 130 is connected to the power source B+ and to a door closed solenoid 136 arranged in combination with the cylinder 72 of each door motor assembly 70 to control closing of the door 64 (FIGS. 1 through 3).

Sensor 132 has open and closed positions. In an open position, sensor 132 detects that the basket 20 is in a position other than a predetermined raised position. In a closed position, sensor 126 detects that basket 20 has reached a predetermined elevational position.

When the operator desires to open the door 64 of basket 20, switch 128 is closed by manually manipulating the switch 110. As shown, switch 128 receives power from the sensor 132. Thus, until the basket 20 is elevationally moved to a predetermined elevated position as monitored by sensor 132, switch 128 is not powered. Once the basket 20 is sufficiently raised, however, the sensor 132 monitors that the basket 20 has reached the predetermined elevational position and the circuit to the solenoid 134 of each hydraulic motor assembly 70 is completed thus allowing the door 64 of basket 20 to be opened.

After the cotton is discharged from the basket 20, or at other times selected by the operator, the door 64 is closed as by closing switch 130, thus energizing the door closed solenoid 136 associated with cylinder 72 and thereby operating each motor assembly 70 to close door 64. Of course, closing switch 130 likewise results in a change in the state of switch 128 thereby effectively disabling the door open solenoid 134.

In the illustrated embodiment, the conveyor switch 112 is arranged in series with the basket position sensor 132 and a door open sensor 138. The door open sensor 138 is connected to the solenoid 140 which controls operation of the conveyor motor assembly 82 and, thus, the conveyor assembly 78. Sensor 138 monitors the position of the door 64 on basket 20 and has open and closed positions.

As long as the door 64 on basket 20 is in other than an open position, the sensor 138 is conditioned to prevent that portion of the circuit leading to the conveyor solenoid 140 from being completed thereby inhibiting operation of the motor assembly 82 and the conveyor assembly 78. When the door 64 of the basket 20 is in an open position, the sensor 138 is conditioned to complete that portion of the circuit leading to the conveyor solenoid 140 thus enabling operation of the conveyor assembly 78 to discharge cotton from the basket 20. Accordingly, when the control switch 106 is set to effect normal discharge of cotton from the basket 20, the operational circuitry 102 will not allow the motor assembly 82 to operate the conveyor assembly 78 until the basket 20 is in the elevated position, the door 64 is in the open position, and the conveyor switch 112 is activated. In the preferred embodiment the conveyor switch 112 is a momentary switch so that the conveyor assembly 78 will only operate as long as the conveyor switch 112 is manually operated by the operator.

When the control switch 106 is set to its other or second position, however, the by-pass circuitry 104 is enabled. Notably, enabling by-pass circuitry permits the expedient discharge of cotton from the basket 20 by by-passing the basket lift switch 108, the door open switch 110 and conveyor switch 112. Enabling the by-pass circuitry 104 allows each door motor assembly 70 and the conveyor motor assembly 82 to be automatically energized notwithstanding the elevation of the basket 20. In the illustrated form, the by-pass circuitry 104 is configured such that when the control switch 106 is moved to its by-pass position the door open solenoid 134 is energized to open the door 64 in the basket 20 and power is simultaneously delivered to energize solenoid 140 thereby operating the conveyor assembly 78 after the sensor 138 detects that the door 64 of the basket 20 is open. Notably, the by-pass circuitry 104 operates independently of the basket lift switch 108 so that cotton can be ejected from the basket 20 when the basket 20 is in its harvesting position. Furthermore, the by-pass circuitry 104 can operate independently of the basket lift sensor 132. Since the by-pass circuitry 104 works independent of the manually operated switches 108, 110 and 112, it is unnecessary for the operator to proceed through the predetermined sequence of switch manipulation to expeditiously discharge cotton from the basket 20.

As is known in the art of cotton harvesters, the fan assembly 26 operates under the influence of a conventional clutch assembly (not shown) which is controlled, through a solenoid 142 (FIG. 4). Energization of the solenoid 142 is effected through fan circuitry 144 that is connected to the control switch 106. As shown, the fan circuitry 144 includes a manually activated fan switch 145, a fan operation relay 146, and a fan control rotation module 148 connected in series with each other and interposed between the control switch 106 and the solenoid 142 for operating the clutch assembly and thereby the fan assembly 26.

The fan operation relay 146 includes a movable contact 150 and a normally open contact 152. The movable contact 150 is connected to the power source B+ on the harvester. In the illustrated embodiment, the normally open contact 152 is connected to the fan solenoid 142 through the fan rotation module 148. The fan rotation module 148 can be substantially similar to that disclosed in U.S. Pat. No. 5,025,614 to J. H. Osborn et al., the entirety of which is incorporated herein by reference.

During normal operation of the harvester 10, basket 20 is in a lowered position, as shown in FIGS. 1 and 2, and the control switch 106 is normally set to enable the operational circuitry 104. In the illustrated embodiment, when the switch 106 is set to enable the operational circuitry 104, such setting likewise enables the fan circuitry 144. When the operator closes the fan switch 145, power is delivered to the relay 146 whereby causing the contact 150 to shift thereby allowing power to be directed to the fan rotation module 148. As explained in detail in U.S. Pat. No. 5,025,614, the purpose of the fan rotation module 148 is to detect the speed of the engine on the harvester 10. As long as the engine speed is within a predetermined range of speeds, the solenoid 142 is operated to permit operation of the fan assembly 26. As mentioned, operation of the fan assembly 26 serves to draw harvested cotton into and propel the cotton through the duct structure 24.

When the operator desires to empty the harvested cotton into a wagon, truck or module builder, the basket 20 is normally raised to a cotton discharge position as shown in FIG. 3. Elevation of the basket 20 is accomplished by conditioning switch 108 to energize solenoid 122 thereby extending the basket lift cylinders 60, 62.

When the basket 20 is in its elevated position, the operator opens the door 64 on the basket 20 by using the switch 110. As will be appreciated, the operational circuitry 102 only activates the door motor assembly 70 when the basket lift sensor 132 monitors that the basket 20 is in the predetermined elevated position. Once the door 64 is in the open position, as detected by sensor 138, the conveyor assembly 78 can then be actuated to remove the cotton from the basket 20 and into the receiving container. The operator actuates the conveyor assembly 78 by maintaining the conveyor switch 112 closed. As will be appreciated, the circuit between switch 112 and solenoid 140 for operating the conveyor assembly 78 will not be completed until sensor 138 detects that the door 64 of basket 20 has been opened.

After cotton has been discharged from the basket 20 under normal operation of the harvester 10, the operator stops the movement of the conveyor assembly 78 by deactivating the momentary conveyor switch 112. Once the conveyor assembly 78 is stopped, the operator closes the door 64 on the basket 20 by activating the door close switch 130. Thereafter, the basket 20 is lowered from the elevated position to the harvesting position by moving the basket lift switch 108 to complete the circuit leading to solenoid 124.

It will be understood that occasions occur where the cotton does not need to or cannot be ejected from the basket 20 into a waiting truck or wagon in the manner described above. In some of these situations, cotton will need to be unloaded expeditiously. With the present invention, the operator can unload the cotton from the basket 20 and can leave the driving compartment 22 of the harvester 10 and know that the expeditious discharge of cotton from the basket 20 will be carried out automatically.

To effect the automatic discharge of cotton from the basket 20 without the basket 20 being elevated requires only that the operator position the control switch 106 in its second position to enable the by-pass circuitry 104. Accordingly, a sequential operation of switches is not required as under normal operating conditions. When the by-pass circuitry 104 is activated, the operator may thereafter leave the operator compartment 22, the fan circuitry 144 is disabled, and solenoid 134 will be energized to enable the door motor assembly 70 to open the door 64. When the by-pass circuitry 104 is enabled, power is also delivered to the door sensor 138. When the door 64 is in its open position, the door open sensor 138 will close thus directing power to solenoid 140 thereby operating the conveyor motor assembly 82 such that the conveyor assembly 78 removes cotton from the basket 20.

When the control switch 106 is set to enable the by-pass circuitry 104, power is interrupted to the relay 146 thus causing contact 150 to return to its normally open position. As such, power to the fan solenoid 142 is interrupted thus disabling fan assembly 26. Accordingly, when by-pass circuitry 104 is enabled, the fan assembly 26 is disabled and, thus, harvested cotton is neither drawn into nor propelled toward the basket 20.

Notably, the fan rotation module 148 has been slightly modified from that shown in U.S. Pat. No. 5,025,614. With the present invention, after the contact 150 of relay 146 has been shifted to a normally open position following energization of the by-pass circuitry 104, the module 148 continues to monitor the engine speed to inhibit damage to the fan clutch assembly but requires the fan switch 145 to be reset following the operator returning the control switch 106 to enable the operational circuitry 102. This extra level of protection is intended to protect the fan clutch assembly against inadvertent damage.

The present invention allows for different methods of cotton discharge from the basket 20 of the cotton harvester 10. Under normal harvesting conditions, the operational circuitry 102 effects the discharge of cotton from the basket 20 following elevational movement of the basket 20 to its discharge position. Situations are encountered, however, requiring the expedient discharge of cotton from the basket 20. With the present invention, such situations are addressed by allowing the control switch 106 to change state, thereby enabling the by-pass circuitry 104. Once the by-pass circuitry 104 is enabled, cotton is automatically discharged from the basket 20 even though the basket 20 is in a lowered harvesting position. Advantageously, and because the cotton is automatically discharged from the basket, the operator is permitted to leave the harvester after the switch 106 is set to enable the by-pass circuitry 104. Moreover, once the by-pass circuitry 104 is enabled, the fan assembly 26 is disabled thus preventing further cotton from being drawn into the duct structure or blown into the basket 20.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A control system for a cotton harvester having a mobile frame, a plurality of row units mounted at a fore end of the frame for harvesting cotton from plant rows as the harvester is driven across a field, a basket for receiving cotton harvested by said row units, said basket being elevationally movable relative to the frame between a harvesting position and an elevated position and comprising a floor with spaced walls extending upwardly therefrom, and wherein said basket includes a door movable between open and closed positions, and a conveyor for discharging cotton from said basket, said basket further including a first motor assembly for controlling the elevation of said basket, a second motor assembly for controlling the position of said door, and a third motor assembly for operating said conveyor, said control system comprising:

operational circuitry interposed between a power source and said second and third motor assemblies, said operational circuitry including a first sensor for monitoring the elevational position of said basket, a first switch connected to said first sensor for operating said second motor assembly to open said door after said first sensor detects said basket is in said elevated position, a second sensor for monitoring the position of the door, and a second switch connected to said second sensor for operating said third motor assembly to operate said conveyor, said second switch and said second sensor being connected in series to said first sensor so that said conveyor is operated after said basket is raised to said elevated position and said door is opened;

by-pass circuitry for connecting said power source to said second and third motor assemblies used to position the door and operate the conveyor, said by-pass circuitry including said second sensor for monitoring said door position, wherein said second sensor is connected to said third motor assembly so that said conveyor is operated after said second sensor detects said door is in said open position; and a control switch having a first position wherein said operational circuitry is enabled during normal operation of the harvester to discharge cotton in response to a predetermined manual sequence of said switches, said control switch being movable to a second position wherein said by-pass circuitry is enabled for automatically affecting the discharge of cotton from said basket without requiring manual operation of said first and second switches.

2. The control system according to claim 1 wherein said manual sequence involves activating said first switch before actuating said second switch.

3. The control system according to claim 1 wherein said operational circuitry further comprises:

a third switch for operating said second motor assembly to close said door after cotton has been discharged from said basket.

4. The control system according to claim 1 further including a fourth switch for controlling said first motor assembly used to elevationally position said basket, and wherein said normal operation of said control system includes actuation of said fourth switch.

5. The control system according to claim 4 wherein said manual sequence involves actuating said fourth switch before said first switch.

6. The control system according to claim 1 wherein said harvester includes a duct structure and a fan assembly for conveying cotton harvested by said row units from said row units into said basket, said control system further comprises:

fan circuitry connected to said control switch for controlling the operation of said fan assembly, and wherein said fan circuitry is operational when said control switch is in said first position and is disengaged when said control switch is in said second position.

7. The control system according to claim 6 wherein said fan circuitry further comprises:

a fifth switch for initializing said fan circuitry.

8. A control system for a cotton harvester having a mobile frame, a plurality of row units mounted to said frame for harvesting cotton from plant rows as said harvester is driven across a field, a basket for receiving and holding cotton harvested by said row units, said basket being elevationally movable relative to said frame and comprising a floor with spaced walls extending upwardly therefrom and further includes a door movable between open and closed positions, and a conveyor for discharging cotton from said basket, said basket further including a first motor assembly for controlling the elevation of said basket, a second motor assembly for controlling the position of said door, and a third motor assembly for controlling operation of said conveyor, said control system comprising:

an operational circuit connected to a power source of said harvester for effecting the discharge of cotton from said basket in a predetermined sequence, said operational circuitry including a first manually operated switch for controlling said door motor assembly in a manner opening said door after said basket is elevated to a predetermined position above said frame and a second manually operated switch for controlling said conveyor motor assembly in a manner operating said conveyor to discharge cotton from said basket after said door is moved to said open position, said second switch operating said second motor assembly after said basket is in said predetermined position;

a by-pass circuit connected to said power source for automatically effecting the discharge of cotton from said basket, said by-pass circuitry controlling said door motor assembly for the opening of said door and the conveyor motor assembly for operating said conveyor after the door is moved to said open position; and a control switch for selectively enabling said operational circuit or said by-pass circuit.

9. The control system according to claim 8 wherein said predetermined sequence involves actuating said first switch before said second switch so that said door is open before said conveyor is operated.

10. The control system according to claim 8 wherein said operational circuitry further comprises:

a first sensor for monitoring the position of said basket so that said door does not open before said basket is in said elevated position, said first sensor being connected to said first switch; and a second sensor for monitoring the position of said door so that said conveyor does not operate before said door is in said open position, said second sensor being connected to said second switch.

11. The control system according to claim 8 wherein said by-pass circuitry further comprises:

said sensor for monitoring the position of said door so that said conveyor does not operate before said door is in said open position.

12. The control system according to claim 8 wherein said operational circuitry further comprises:

a third manually operated switch for controlling said door motor assembly in a manner closing said door.

13. The control system according to claim 8 wherein said harvester further includes duct structure between said row units and said basket and a fan assembly connected to said duct structure for drawing said cotton harvested by said row units into said duct structure and forcibly blowing said cotton through said duct structure into said basket, said control system further comprising:

fan circuitry connected to said control switch for controlling said fan assembly, said fan assembly being operational when said operation circuit is enabled by said control switch and is disabled when said by-pass circuit is enabled by said control switch.

14. The control system according to claim 13 wherein said fan circuit further comprises:

a fourth manually operated switch for initializing said fan assembly when said operational circuitry is enabled.

15. The control system according to claim 8 further including:

a fifth manually operational switch for elevating said basket into said elevated position.

16. The control system according to claim 15 wherein said predetermined sequence involves actuating said fifth switch before said first switch and actuating said first switch before said second switch so that cotton is unloaded from said harvester.

17. A control system for a cotton harvester having a mobile frame, a plurality of row units mounted on the frame for harvesting cotton from plant rows as the harvester is driven across a field, duct structure for directing cotton from said row units to a storage basket located on said frame, a fan assembly for directing a flow of air into said duct structure thereby directing cotton from said row units into said duct structure and force propelling the cotton into said basket, said basket being vertically movable under the influence of a first motor assembly between a harvesting position and an elevated position, and said basket including a floor and walls extending up therefrom for containing cotton within said basket, one of said walls comprising a door movable between an open and a closed position under the influence of a door motor assembly, wherein said floor having a conveyor for discharging cotton from said basket under the influence of a conveyor motor assembly when said door being in said open position, said control system comprising:

an operation circuit having a first sensor for monitoring when the basket is in said elevated position, a second switch connected to said first sensor for controlling said door motor assembly, a second sensor for monitoring the position of said door, a third switch connected to said second sensor for controlling said conveyor motor assembly;

a by-pass circuit for controlling said door motor assembly and said conveyor motor assembly and having said second sensor connected to said conveyor motor assembly; and a control switch having a first position for normal operation of said control system using said operational circuit and a second position for automatic operation of said control system using said by-pass circuit;

wherein for normal operation of said control system said door motor assembly controls the position of said door when said first sensor monitors said basket in said elevated position and said conveyor motor assembly controls said conveyor when said second sensor monitors said door in said open position; and wherein for automatic operation of said control system said door motor assembly controls the position of said door and said conveyor motor assembly controls said conveyor when said second sensor monitors said door in said open position.

18. The control system according to claim 17 further comprising:

fan circuitry connected to said control switch for controlling said fan assembly;

wherein for normal operation of said control system said fan circuitry controls said fan unit, and wherein for automatic operation of said control system said fan circuitry disengages said fan assembly.

19. A system for controlling the discharge of cotton from a basket of a cotton harvester, said basket being mounted on a frame of said harvester for elevational movement between a harvesting position and a discharge position under the influence of hydraulic motors, said basket including a door movable between an open position, to allow cotton to be discharged from said basket, and a closed position, said control system comprising:

operational circuitry connected to a power source on said harvester for effecting the discharge of cotton from said basket through said door only after said basket is elevationally moved to said discharge position;

by-pass circuitry connected to said power source for effecting the discharge of cotton from said basket through said door while said basket is in other than said elevated discharge position; and a control switch connected to both of said circuitries and manually conditionable into either of at least two positions, wherein when said control switch is conditioned in said first position said operational circuitry is enabled, and when said control switch is conditioned in said second position said by-pass circuitry is enabled.

20. The control system according to claim 19 wherein said operational circuitry comprises a first manually operated switch connected to said power source for controlling said hydraulic motors;

a sensor for detecting whether said basket is in said discharge position; and a second manually operated switch connected to said power source and said sensor for discharging said cotton from said basket after said sensor detects whether said basket is in said discharge position.

21. The control system according to claim 19 wherein said basket includes a door through which cotton is discharged, said door being movable between closed and open positions under the influence of another set of hydraulic motors, and wherein said operational circuitry and said by-pass circuitry effect the movement of said door.

22. A system for controlling the discharge of cotton from a basket of a cotton harvester, said basket being mounted on a frame of said harvester for elevational movement between harvesting and discharge positions under the influence of a first set of hydraulic motors, said basket including a door through which cotton is discharged from said basket, said door being movable between closed and open positions under the influence of a second set of hydraulic motors, said control system comprising:

a first manually operated switch connected to said power source for controlling the elevational position of said basket by said first set of hydraulic motors;

operational circuitry connected to a power source on said harvester for effecting the discharge of cotton from said basket following elevational movement of said basket to said discharge position, with said operational circuitry being connected to said second set of hydraulic motors for effecting movement of said door between the closed and open positions, and wherein said operational circuitry comprises a first sensor for detecting whether said basket is in said discharge position, a second manually operated switch connected to said power source and said first sensor for controlling said position of said door by said second set of hydraulic motors after said first sensor detects said basket in said discharge position, a second sensor for detecting whether said door is in said open position, and a third manually operated switch connected to said power source and said second sensor for effecting the discharge of cotton from said harvester after said second sensor detects said door in said open position;

by-pass circuitry connected to said power source for effecting the discharge of cotton from said basket while said basket is in said harvesting position; and a control switch connected to said circuitries and manually movable to either of at least two positions, wherein said first position of said control switch selectively enables said operational circuitry, and wherein said second position of said control switch enables said by-pass circuitry.

23. The control system according to claim 22 wherein said operational circuitry further comprises:

a fourth manually operated switch connected to said power source for controlling the position of said door between said open and closed positions.

24. The control system according to claim 22 wherein said by-pass circuitry controls the position of said door by said second set of hydraulic motors and includes said second sensor so that said cotton is discharged when said second sensor detects said door in said open position.

25. A system for controlling the discharge of cotton from a basket of a cotton harvester, said cotton harvester including a frame, a plurality of row units mounted on said frame for harvesting cotton from plan rows as the harvester is driven across a field, a duct structure for directing harvested cotton from said row units to said basket, a fan assembly mounted on said frame for drawing harvested cotton into said duct structure and propelling the cotton through said duct structure and into said basket, said basket being mounted on said frame for elevationally moving between a harvesting position and a discharging position under the influence of hydraulic motors, said control system comprising:

operational circuitry connected to a power source of said harvester for effecting the discharge of cotton from said basket following elevational movement of said basket to said discharge position;

by-pass circuitry connected to said power source for effecting the discharge of cotton from said basket while said basket is in said harvesting position;

fan circuitry connected to said power source for effecting the operation of said fan assembly; and a control switch connected between said circuitries and manually movable between at least two positions including a first position for selectively enabling said operational circuitry and said fan circuitry and a second position for selectively enabling said by-pass circuitry and disengaging said operational circuitry and said fan circuitry.

26. The control system according to claim 25 further including a first manually operated switch connected to said power source for controlling said hydraulic motors and wherein said operational circuitry comprises:

a sensor for detecting whether said basket is in said discharge position; and a second manually operated switch connected to said power source and said sensor for discharging cotton from said basket after said sensor detects whether said basket is in said discharge position.

27. The control system according to claim 26 wherein said fan circuitry comprises:

a third manually operated switch connected to said power source for initializing said fan circuitry after said control switch is moved from said second position to said first position.

* * * * *